United States Patent
Zellner

(10) Patent No.: US 7,349,333 B2
(45) Date of Patent: *Mar. 25, 2008

(54) ASSOCIATED SYSTEMS AND METHODS FOR PROVIDING DATA SERVICES USING IDLE CELL RESOURCES

(75) Inventor: Sam Zellner, Dunwoody, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 797 days.

This patent is subject to a terminal disclaimer.

(21) Appl. No.: 10/663,087

(22) Filed: Sep. 16, 2003

(65) Prior Publication Data

US 2004/0125800 A1 Jul. 1, 2004

Related U.S. Application Data

(63) Continuation-in-part of application No. 09/922,042, filed on Aug. 3, 2001, now Pat. No. 7,065,061, which is a continuation of application No. 09/579,000, filed on May 25, 2000, now abandoned, which is a continuation of application No. 08/903,534, filed on Jul. 30, 1997, now Pat. No. 6,069,882.

(51) Int. Cl.
  H04L 12/26 (2006.01)
  H04J 3/14 (2006.01)
  G06F 11/00 (2006.01)
  G08C 15/00 (2006.01)
(52) U.S. Cl. .................. 370/229; 370/389; 370/412
(58) Field of Classification Search ........ 370/229–236, 370/326–331, 342–349, 412–418; 455/450–454, 455/512–517

See application file for complete search history.

(56) References Cited

U.S. PATENT DOCUMENTS 4,803,679 A 2/1989 Shimizu (Continued)

FOREIGN PATENT DOCUMENTS

EP 0 370 826 A2 5/1990

(Continued)

OTHER PUBLICATIONS

"Digital Cellular Telecommunications System (Phase 2+) (GSM); Universal Mobile Telecommunications System (UMTS); enhanced Multi-Level Precedence and Pre-emption Service (eMLPP)—Stage 3 (3G TS 24.067 version 3.0.0 Release 1999)," Global System for Mobile Communication, ETSI TS 124 067 3.0.0 v3.0.0 (Jan. 2000).

(Continued)

Primary Examiner—Man U. Phan
(74) Attorney, Agent, or Firm—Hope Baldauff Hartman, LLC

(57) ABSTRACT

Associated systems and methods for providing data services using idle cell capacity in a communications system. The systems and methods assign priorities to each remote user device in the communications system. In response to a request for service for a remote user device, the switch determines whether an idle channel is available for the remote user device. If no idle channel is available, the switch determines whether a remote user device with a lower priority than the requesting remote user device is using a channel. If a lower priority remote user device is using a channel, its call is terminated and the channel is assigned to the requesting remote user device. If no lower priority remote user device is using a channel, the request for service is put into an ordered queue to wait for the next available idle channel.

31 Claims, 7 Drawing Sheets

U.S. PATENT DOCUMENTS

| | | | |
|---|---|---|---|
| 5,131,020 A | 7/1992 | Liebesny et al. | |
| 5,157,709 A | 10/1992 | Ohteru | |
| 5,226,071 A | 7/1993 | Bolliger et al. | |
| 5,343,511 A | 8/1994 | Osada | |
| 5,404,355 A | 4/1995 | Raith | |
| 5,457,735 A | 10/1995 | Erickson | |
| 5,513,242 A | 4/1996 | Mukerjee et al. | |
| 5,521,925 A | 5/1996 | Merakos et al. | 370/95.3 |
| 5,539,729 A | 7/1996 | Bodnar | |
| 5,539,923 A | 7/1996 | Matsumoto | |
| 5,570,411 A | 10/1996 | Sicher | |
| 5,574,977 A | 11/1996 | Joseph et al. | |
| 5,583,869 A | 12/1996 | Grube et al. | |
| 5,615,249 A * | 3/1997 | Solondz | 455/450 |
| 5,678,179 A | 10/1997 | Turcotte et al. | |
| 5,694,455 A | 12/1997 | Goodman | |
| 5,708,968 A | 1/1998 | Suzuki | |
| 5,729,541 A | 3/1998 | Hamalainen et al. | |
| 5,732,073 A | 3/1998 | Kusaki et al. | |
| 5,742,588 A | 4/1998 | Thornberg et al. | |
| 5,752,193 A | 5/1998 | Scholefield et al. | |
| 5,761,618 A | 6/1998 | Lynch et al. | |
| 5,787,080 A | 7/1998 | Hulyalkar et al. | |
| 5,787,358 A | 7/1998 | Takahashi | |
| 5,790,522 A | 8/1998 | Fichou et al. | |
| 5,812,656 A | 9/1998 | Garland et al. | |
| 5,832,384 A | 11/1998 | Balachandran et al. | |
| 5,857,018 A | 1/1999 | Sumner et al. | |
| 5,862,485 A | 1/1999 | Linnewed, Jr. et al. | |
| 5,867,790 A | 2/1999 | Hamada | |
| 5,914,945 A | 6/1999 | Abu-Amara et al. | |
| 5,926,469 A | 7/1999 | Norstedt et al. | |
| 5,930,239 A | 7/1999 | Turcotte | |
| 6,009,331 A * | 12/1999 | Ueda | 455/450 |
| 6,026,289 A | 2/2000 | Zellner et al. | |
| 6,069,882 A | 5/2000 | Zellner et al. | |
| 6,091,709 A | 7/2000 | Harrison et al. | |
| 6,101,389 A | 8/2000 | Koizumi et al. | |
| 6,175,621 B1 | 1/2001 | Begeja | |
| 6,192,248 B1 * | 2/2001 | Solondz | 455/450 |
| 6,201,966 B1 | 3/2001 | Rinne et al. | |
| 6,226,277 B1 * | 5/2001 | Chuah | 370/328 |
| 6,282,429 B1 | 8/2001 | Baiyor et al. | |
| 6,304,578 B1 | 10/2001 | Fluss | 370/413 |
| 6,321,093 B1 * | 11/2001 | Dalal | 455/512 |
| 6,327,364 B1 | 12/2001 | Shaffer et al. | |
| 6,335,922 B1 | 1/2002 | Tiedemann, Jr. et al. | |
| 6,363,065 B1 | 3/2002 | Thornton et al. | 370/352 |
| 6,377,548 B1 * | 4/2002 | Chuah | 370/233 |
| 6,421,335 B1 | 7/2002 | Kilkki et al. | |
| 6,434,380 B1 | 8/2002 | Andersson et al. | |
| 6,470,024 B1 | 10/2002 | Hamalainen et al. | |
| 6,519,260 B1 | 2/2003 | Galyas et al. | |
| 6,522,653 B1 | 2/2003 | Kilkki | |
| 6,549,938 B1 | 4/2003 | Kilkki et al. | |
| 6,567,416 B1 * | 5/2003 | Chuah | 370/418 |
| 6,587,433 B1 | 7/2003 | Borella et al. | |
| 6,665,293 B2 | 12/2003 | Thornton et al. | 370/352 |
| 6,856,628 B1 | 2/2005 | Bychowsky et al. | 370/412 |
| 6,885,657 B1 | 4/2005 | Rabenko et al. | 370/352 |
| 7,209,437 B1 | 4/2007 | Hodgkinson et al. | 370/230 |

FOREIGN PATENT DOCUMENTS

| | | |
|---|---|---|
| EP | 0 717-579 A2 | 6/1996 |
| EP | 0 752793 A2 | 1/1997 |
| WO | WO 97/11566 | 3/1997 |
| WO | WO 97/16040 | 5/1997 |

OTHER PUBLICATIONS

"Digital Cellular Telecommunications System (Phase 2+) (GSM); Universal Mobile Telecommunications System (UMTS); enhanced Multi-Level Precedence and Pre-emption Service (eMLPP)—Stage 2 (3G TS 23.067 version 3.0.0 Release 1999)," Global System for Mobile Communication, ETSI TS 123 067 3.0.0 v3.0.0 (Jan. 2000).

"Digital Cellular Telecommunications System (Phase 2+) (GSM); Universal Mobile Telecommunications System (UMTS); Enhanced Multi-Level Precedence and Pre-emption Service (eMLPP)—Stage 1 (3G TS 22.067 version 3.0.1 Release 1999), " Global System for Mobile Communication, ETSI TS 122 067 V3.0.1 (Jan. 2000).

"Digital Cellular Telecommunications System (Phase 2+) (GSM); Universal Mobile Telecommunications System (UMTS); Service Accessibility (3G TS 22.011 version 3.1.0 Release 1999)," Global System for Mobile Communication, ETSI TS 122 011 V3.1.0 (Jan. 2000).

"Digital Cellular Telecommunications System (Phase 2+); High Speed Circuit Switched Data (HSCSD)—Stage 2 (GSM 03.34)," Global System for Mobile Communication, TS 101 038 V5.0.1 (Apr. 1997).

"Digital Cellular Telecommunications System (Phase 2+); High Speed Circuit Switched Data (HSCSD)—Stage 1 (GSM 02.34)," Global System for Mobile Communication, ETSI GSM 02.34 V5.1.0, Mar. 1997.

"Universal Mobile Telecommunications System (UMTS); UTRAN 1u Interface RANAP Signalling (3G TS 25.413 version 3.0.0 Release 1999)," ETSI TS 125 413 V3.0.0 (Jan. 2000).

"Digital Cellular Telecommunications System (Phase 2); Specification of the Subscriber Identity Module-Mobile Equipment (SIM-ME) interface (GSM 11.11 version 4.19.1)," European Telecommunication Standard, ETS 300 608, Jan. 1998.

In the Matter of "The Development of Operational, Technical and Spectrum Requirements for Meeting Federal, State and Local Public Safety Agency Communication Requirements Through the Year 2010," Federal Communications Commission FCC 00-242, Second Report and Order, Adopted Jul. 3, 200, Released Jul. 13, 2000.

"Differential Channel Allocation," Function Specification 3/155 17-ANT 240 07 Uen B.

"Radio Equipment and Systems (RES); Trans-European Trunked Radio (TETRA); Voice plus Data (V+D); Part 1: General network design," European Telecommunications Standards Institute, ETS 300 392-1, Feb. 1996.

"Radio Equipment and Systems (RES); Trans-European Trunked Radio (TETRA); Voice plus Data (V+D); Part 2: Air Interference (AI)," European Telecommunications Standards Institute, ETS 300 392-2, Mar. 1996.

"Terrestrial Trunked Radio (TETRA); Voice plus Data (V+D); Part 12: Supplementary services stage 3; Sub-part 16: Pre-emptive Priority Call (PPC)," European Telecommunications Standards Institute, final draft ETSI EN 300 392-12-16 v1.2.0 (May 2004).

"Terrestrial Trunked Radio (TETRA); Voice plus Data (V+D); Part 11: Supplementary services stage 2; Sub-part 16: Pre-emptive Priority Call (PPC)," European Telecommunications Standards Institute, ETS 300 392-11-16, Sep. 2000.

"Ttrans European Trunked Radio (TETRA) system; Technical requirements specification Part 1: Voice plus Data (V+D) systems;" European Telecommunications Standards Institute, ETR 086-1, Jan. 1994.

"Radio Equipment and Systems (RES); Trans-European Trunked Radio system (TETRA); Voice plus Data (V+D) Open channel" European Telecommunications Standards Institute, ETR 120, Nov. 1994.

"Radio Equipment and Systems (RES); Trans-European Trunked Radio (TETRA); User requirements for Subscriber Identity Module (SIM)" European Telecommunications Standards Institute, ETR 295, Aug. 1996.

"Terrestrial Trunked Radio (TETRA); Voice plus Data (V+D); Designers' guide; Part 1: Overview, technical description and radio aspects ," European Telecommunications Standards Institute, ETR 300-1, May 1997.

"Radio Equipment and Systems (RES); Trans-European Trunked Radio (TETRA); Voice plus Data (V+D); Part 10: Supplementary Services stage 1; Part 10-01: Call identification" European Telecommunications Standards Institute, ETS 300 392-10-01, Apr. 1996.

"Radio Equipment and Systems (RES); Trans-European Trunked Radio (TETRA); Voice plus Data (V+D); Part 10: Supplementary Services stage 1; Part 10-09: Access priority" European Telecommunications Standards Institute, ETS 300 392-10-09, Apr. 1996.

"Radio Equipment and Systems (RES); Trans-European Trunked Radio (TETRA); Voice plus Data (V+D); Part 10: Supplementary Services stage 1; Part 10-16: Pre-emptive priority call" European Telecommunications Standards Institute, ETS 300 392-10-16, Apr. 1996.

Data Communications (Tech Tutorials) "Going the Distance with QOS," Mike Seaman and Bob Klessig, 3Com Corp., Feb. 1999.

Data Communications (Tech Tutorials) "Serving Up QOS End to End," Marguerite Reardon, Nov. 21, 1998.

Data Communications (Tech Tutorials) "The Policy Makers," Stephen Saunders, May 1999.

International Search Report issued by the European Patent Office in PCT/US98/15568, in the name of BellSouth Corporation, mailed Jan. 21, 1999.

Office Action issued by the USPTO having U.S. Appl. No. 09/559,594 on Feb. 24, 2004 (13 pages).

Office Action issued by the USPTO having U.S. Appl. No. 09/559,594 on Sep. 5, 2003 (16 pages).

Office Action issued by the USPTO having U.S. Appl. No. 09/922,042 on Dec. 8, 2003 (11 pages).

Office Action issued by the USPTO having U.S. Appl. No. 09/922,042 on May 8, 2003 (10 pages).

Office Action issued by the USPTO having U.S. Appl. No. 09/922,042 on Oct. 25, 2002 (7 pages).

Office Action issued by the USPTO having U.S. Appl. No. 09/579,000 on Feb. 5, 2001 (10 pages).

Office Action issued by the USPTO having U.S. Appl. No. 09/559,593 on Feb. 17, 2004 (13 pages).

Office Action issued by the USPTO having U.S. Appl. No. 09/559,593 on Sep. 4, 2003 (15 pages).

"Digital Cellular Telecommunications System (Phase 2+); Enhanced Multi-Level Precedence and Pre-emption Service (eMLPP)—Stage 1 (GSM 02.67)", European Telecommunications Standards Institute, Global System for Mobile Communications Technical Specification, Version 5.0.1, Jul. 1996.

"Digital Cellular Telecommunications System (Phase 2+) Mobile Services Switching Centre—Base Station System (MSC—BSS) Interface; Layer 3 Specification (GSM 08.08)", European Telecommunications Standards Institute, Global System for Mobile Communications Technical Specification, Version 5.4.0, Nov. 1996.

U.S. Official Action dated Nov. 22, 2006 in U.S. Appl. No. 11/248,857.

U.S. Official Action dated Jun. 8, 2007 in U.S. Appl. No. 11/248,857.

U.S. Official Action dated Apr. 30, 2007 in U.S. Appl. No. 11/248,858.

U.S. Official Action dated Nov. 26, 2007 in U.S. Appl. No. 11/248,857.

U.S. Official Action dated Oct. 5, 2007 in U.S. Appl. No. 11/248,858.

* cited by examiner

ASSOCIATED SYSTEMS AND METHODS FOR PROVIDING DATA SERVICES USING IDLE CELL RESOURCES

RELATED APPLICATIONS

This application is a continuation-in-part of U.S. application Ser. No. 09/922,042 entitled "System and Method for Providing Data Services Using Idle Cell Resources," filed Aug. 3, 2001 now U.S. Pat. No. 7,065,061; which is a continuation of U.S. application Ser. No. 09/579,000, entitled "System and Method for Providing Data Services Using Idle Cell Resources," filed May 25, 2000, now abandoned; which is a continuation of U.S. application Ser. No. 08/903,534, entitled "System and Method for Providing Data Services Using Idle Cell Resources," filed Jul. 30, 1997, issued as U.S. Pat. No. 6,069,882; which are incorporated herein by reference.

FIELD OF THE INVENTION

This invention relates in general to communications systems, and more particularly to associated systems and methods for transmitting data using idle communications system resources.

BACKGROUND OF THE INVENTION

Circuit switched communications networks, such as cellular communications systems, generally offer only one class of service which is used primarily for voice calls. In a cellular communications system, voice calls compete with data calls for the same limited number of channels available in a particular cell or access point to the network. Service providers therefore cannot justify pricing data calls differently than voice calls, and as a result, cellular communications systems have not been extensively utilized as data networks.

Packet-based communications networks, such as the Internet, can be used to transmit voice and data calls as well. Generally, packet-based communications networks offer only a single class of service for calls such that voice calls compete with data calls for the same limited number of channels available in a particular node or access point to the network. Similarly, service providers cannot justify pricing calls differently on packet-based communications networks.

Some service providers have sought to overcome the problem of single class service by deploying separate facilities to handle data calls on a reduced rate basis. For example, separate data facilities in a cellular communications system still can only reduce the cost of data calls to the extent that the capital investment for such facilities is lower than the cellular communications systems used for voice calls. Consequently, in existing cellular communications systems, the demand for voice call service sets the price that a carrier will rationally charge for competing data call service.

In many types of communications networks and systems, an important aspect to these networks and systems is the quality of the communications service provided to a subscriber. "Quality of Service" or "QoS" is defined as the measure of communications service quality to a subscriber. QoS can be measured with one or more quantifiable characteristics, such as transmission rates, bandwidth, delay, and error rates. For example, if a subscriber is using the communications network for a call and the call is suddenly interrupted, the subscriber may want to know why the call was interrupted and when continued service can be expected. Utilizing QoS-defined measurements, a service provider can quantify improvements in communications services for subscribers. Nevertheless, in switched and packet-based communications networks, there is a need for improved quality of service (QoS).

In many switched and packet-based communications networks, logic for handling or managing incoming and outgoing calls may create situations where subscribers may be dropped from calls when the network or system handles multiple calls. In some instances, the subscriber may be unaware of a reason for the dropped call, thus causing the subscriber to blame the service provider. Resulting service calls from subscribers to the service provider are time consuming and expensive. Therefore, there is a need for improved call management logic in switched and packet-based communications networks. There is a further need for improved wireless voice and data applications operating on switched and packet-based communications networks.

Moreover, conventional switched and packet-based communications networks cannot handle notification of multiple remote users desiring broadcast and emergency services. For example, in an emergency situation in which multiple subscribers attempt to place calls, conventional communications networks cannot notify multiple remote users such as emergency personnel needing to respond to the emergency situation. Therefore, a need exists for improved broadcast and emergency services operating on in switched and packet-based communications networks.

SUMMARY OF THE INVENTION

Embodiments of the invention address some or all of the needs above. Embodiments of the invention offer multi-level service in a packet-based communications network, as well as in a switched communications network, by providing systems and methods for utilizing idle channels of switched or packet-based communications networks for transmission of data. By offering multi-levels of service on idle channels, a service provider can rationally price data call service below the pricing level of voice call service while at the same time increasing the utilization of the switched and/or packet-based communications networks. Furthermore, by utilizing multi-levels of service on idle channels, relatively low cost voice call service can be offered.

Particularly, systems and methods of the invention are predicated on the fact that many data transmission applications are not particularly time sensitive. By contrast, voice calls are time sensitive and require immediate connection and continuity of connection. A delay in sending e-mail for a few minutes or even a few hours does not substantially reduce the user's perceived value of the data transmission service. Likewise, an interruption in sending e-mail will not substantially reduce the perceived value of the service. Therefore, data calls, unlike voice calls, can wait on the availability of an idle channel. By utilizing idle channels for data transmission, a service provider can rationally price data calls less than the higher priority voice calls. The use of idle channel capacity for data calls at a lower price also assures greater usage of the switched or packet-based communications network.

In order to utilize idle channels for data transmission, systems and methods of the invention assign a priority to each remote user device. The priority of each remote user device is part of the profile and authorization information for each remote user. The priority is associated with the mobile identification Number (MIN) for each remote user. The profile and authorization information including the priority is maintained in a database (such as a home location register (HLR)) in a switch. The switch controls the switched and/or packet-based communications network and provides the computer intelligence for the invention.

When a call request is received at the packet switch for service either from a remote user or to a remote user (first remote user), the switch first checks the profile and authorization information of the first remote user stored in the database and determines the remote user's priority. The switch then ascertains if a channel in the cell (or cell sector) where the first remote user device is located has an idle channel. If an idle channel is available the call to or from the first remote user device is connected immediately without regard to the priority of the first remote user device.

If, however, no idle channel is available for connection of the call to or from the first remote user device, the switch searches the cell for a channel that is being used by a remote user device with a priority that is lower than the priority of the first remote user device. If no lower priority remote user device is found on an active channel, the call request for the first remote user device may be placed in a priority ordered queue of other remote users to await the availability of an idle channel. When the remote user is placed in the ordered queue, the switch notifies the remote user that it has been placed in the queue so that the remote user will not continue requesting service while the remote user's request for service is in the queue. When a channel becomes available the remote user at the head of the ordered queue is then connected. Whether or not a remote user is placed in the queue depends on a number of factors including the profile and authorization information in the database for the remote user, whether the call is inbound or outbound, and how inbound data was handled by the switch. If the remote user has not registered to be queued or if queuing would tie up other resources, its call request will be ended when it can not be quickly connected.

If, however, a lower priority remote user device (second remote user) is found in the node, the switch terminates the call for the second remote user device and connects the call for the first remote user device on the vacated channel. If more than one lower priority remote user device is found in the node and if both lower priority users have the same priority, the lower priority user with the longest call duration will be terminated in favor of the call request for the first remote user device.

At termination of the call of the second remote user in favor of the first remote user, data transmission software of the second remote user recognizes the termination and stores parameters that allow the data transmission of the second remote user to resume at the point in the transmission where termination occurred. Once the call of the second remote user device has been terminated, a request to resume the call for the second remote user device may be placed in the priority ordered queue to await the availability of an idle channel. When the second remote user is placed in the ordered queue, the packet switch notifies the second remote user so that the second remote user will not try to reestablish the connection until its call request reaches the head of the ordered queue. Notifying the second remote user of the call termination and queuing also gives the second remote user the opportunity to shutdown its transmission of data in an orderly fashion. When the terminated call of the second remote user reaches the head of the ordered queue and when an idle channel becomes available, the call is resumed at the point where it was terminated.

When the call request to the first remote user originates from the network and is for data transmission to the first remote user, the packet switch retrieves the profile and authorization information for the first remote user from the database. If the first remote user is a high priority data user with time sensitive data (such as video data associated with a video conference call), the request will be connected based on its priority, and the connection will be maintained for the duration of the call.

If the first remote user, however, is a low priority data device and if the data is not time sensitive, the packet switch will store all of the inbound data from the network and disconnect the call from the network once the inbound data has been stored. To the inbound caller on the network, the call appears to have been immediately connected and completed so that no further call requests for service for that particular inbound call are made by that inbound caller to the switch. In fact, the data is stored in a buffer at the switch or other central location, and a call request to the first remote user is generated at the switch. If an idle channel is available, the first remote user is connected, and the data is delivered (forwarded) from the buffer to the first remote user. If no idle channel is immediately available, the call request for the first remote user is placed in the ordered queue, and the data is delivered (forwarded) from the buffer to the first remote user device when the first remote user moves to the head of the ordered queue and when an idle channel becomes available.

In another aspect of the invention, multiple channel data service is provided by using a mixture of priorities. For example, three channel data service could be provided for a remote user by assigning a high priority to one of the remote user's channels and a lower priority to the other two channels. This mixture of priority assignments allows the remote user to get high priority access just like a voice call at all times on the high priority channel. During off-peak times when idle channels are available for the lower priority data, the remote user could achieve throughput on all three channels at a rate of about three times the voice rate.

Systems and methods according to the various embodiments of the invention allow a switched or packet-based communications network to set up calls based on the priority assigned to each remote user. A call to or from a lower priority remote user, such as a data call, is connected only after the higher priority calls, such as voice calls, are completed and idle channels become available. By prioritizing and using idle channels for lower priority calls, a service provider can rationally offer lower rates on the lower priority calls and at the same time increase the overall utilization of the network.

Systems and methods according to the various embodiments of the invention improve the management of network resources in a communications system, such as a packet-based communications system or a circuit switched communications system. Embodiments of the invention also manage limited network resources in an overload situation. Various aspects of the invention provide call management logic including retrieval of a caller profile, assessment of network resources, comparison of priorities, allocation of network resources including assessing all channels accessible from a mobile device, decision to queue a call, notification of action in queuing or terminating, and termination of a call. For incoming calls, other aspects of the invention provide call management logic including utilization of a priority profile of a called number, determination of the type of call, and providing an option to store or buffer incoming data for later delivery.

DETAILED DESCRIPTION OF EMBODIMENTS

Embodiments of the invention provide systems and methods for managing network resources, such as during an incoming call and for terminating a call. These systems and methods improve the management of network resources in a communications system, such as a packet-based communications system or a circuit switched communications system. Embodiments of the invention also manage limited network resources in an overload situation.

Various aspects of the invention provide call management logic including retrieval of a caller profile, assessment of network resources, comparison of priorities, allocation of network resources including assessing all channels accessible from a mobile device, decision to queue a call, notification of action in queuing or terminating, and termination of a call. For incoming calls, other aspects of the invention provide call management logic including utilization of a priority profile of a called number, determination of the type of call, and providing an option to store or buffer incoming data for later delivery.

One environment for an embodiment of the invention is a conventional cellular communications system. Such cellular communications systems include among others those constructed and operated in accordance with various well known standards, such as TDMA (IS-54 and IS-136), AMPS (IS-41), NAMPS, GSM, DCS1800, DCS1900, CDMA (IS-95), PACS, TACS, JTACS, and PDC. The invention also has applicability to any circuit switched communications system or network, as well as to any packet-based communications system or network. An example of a switched circuit communications network is a system having a control switch and a controlled node access point with a limited number of channels at each node, such as digital loop carrier networks. A suitable packet-based communications network is a communications system constructed and operated in accordance with various well known standards such as Short Messaging Service (SMS), General Packet Radio Service (GPRS), Enhanced Data rates for Global Evolution (EDGE), and the 1XRTT standard for Code Division Multiple Access (CDMA).

Figure 1:
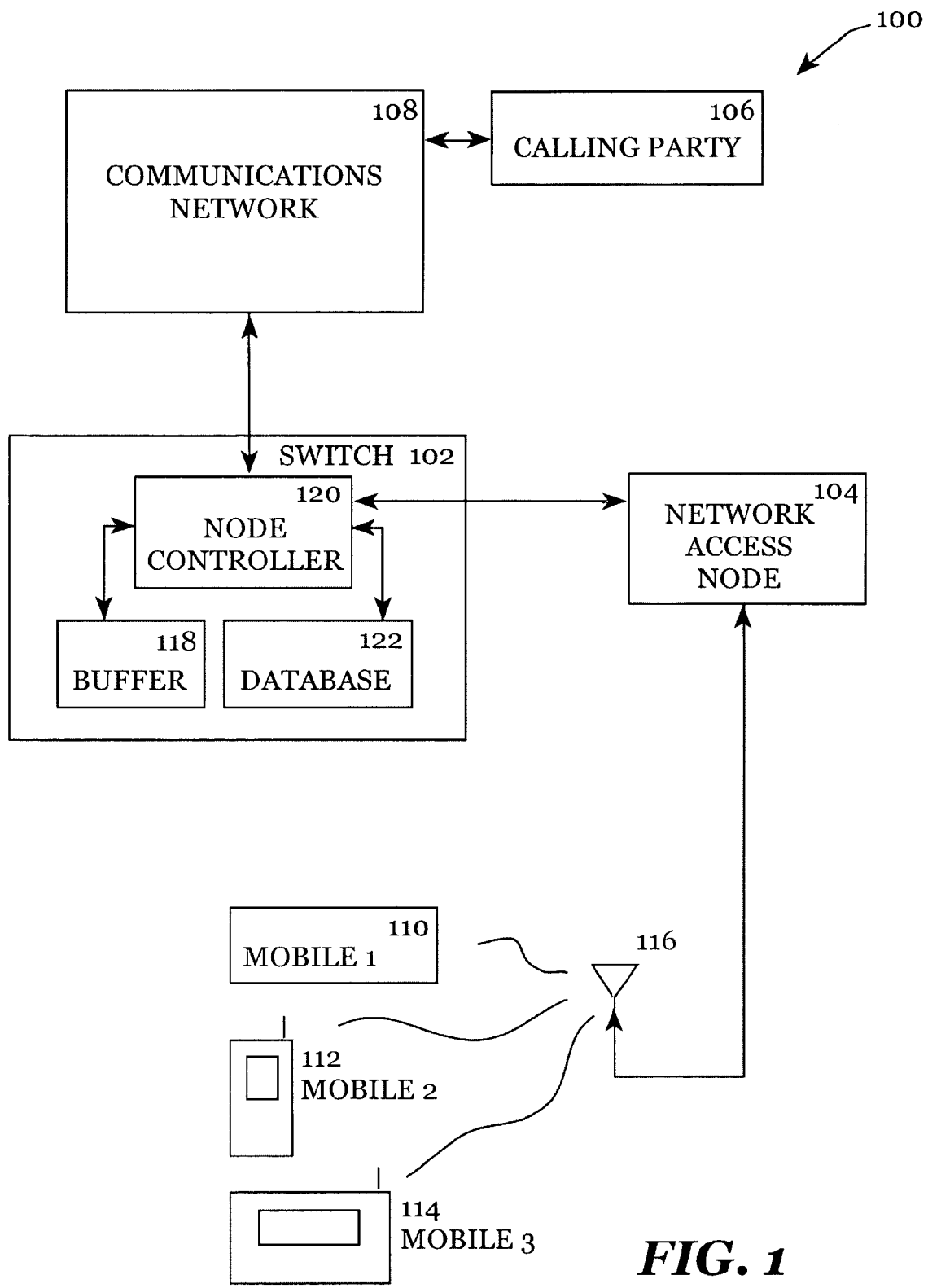
FIG. 1 is block diagram of a packet-based communications system which is an environment for various embodiments of the invention.

Turning to the drawings in which like numbers reference like elements or steps, in the several figures, FIG. 1 of this specification is a schematic diagram of a packet-based communications system 100 which constitutes one environment for the invention. The packet-based communications system 100 shown comprises at least one packet switch 102 and a number of nodes, such as illustrated node 104. The packet switch 102 can be a packet switch, router, a switch adapted to handle data packets, or a switch adapted to handle data calls and voice calls.

Generally, a calling party 106 transmits voice or data via a network 108. Note that the network 108 can be a packet-based network such as the Internet or other compatible type of communications network that handles data packets. In other embodiments, the network 108 may be a public switched telecommunications system, or another compatible communications-type network or system that can handle packet-type or radio communications.

Each node, such as the node 104, transmits data to and receives data from at least one remote user, such as remote users 110 (mobile 1), 112 (mobile 2), and 114 (mobile 3) via a transmitter/receiver 116. Typically, communication between node 104 and remote users 110, 112, 114 is via radio frequency. Each node 104 has a limited number of channels on which data can be transmitted and received. While each of the remote users 110, 112, and 114 is illustrated as an automobile-based or mobile communication device user, the remote users may include a variety of devices or applications, such as personal digital assistants (PDAs), wireless telephones, handheld telephones, facsimile machines, messaging devices, computers, telemetry devices, and control devices, among others.

The packet switch 102 comprises a buffer 118, a node controller 120, and a database 122. The node controller 120 can be a high-speed general purpose digital computer that is programmed to control the functions required of the packet switch 102. The database 122 can be a memory or storage-type device under control of the node controller 120. The database 122 is similar in functionality to a home location register (HLR), in that the database 122 includes profile and authorization information including the priority for each of the remote users 110, 112, 114. The buffer 118 is also a memory device under control of the node controller 120 that is used to receive and store data for later delivery to a remote user in communication with the packet switch 102 in accordance with one aspect of the invention. While the buffer 118 and database 122 are illustrated as within the packet switch 102, the buffer 118 and database 122 could be remotely located.

The database 122 is configured to store a profile for each remote user, such as a caller profile that includes caller information such as priority information. Priority information can be a predetermined priority for a particular caller, or a predetermined priority for a particular service that the caller is utilizing at a particular moment or time. Caller information can include identification information such as a caller's name, a predetermined user name, or directory number. A profile for remote users, including priority information and identification information associated with each remote user, can also be stored by the database 122.

The node controller 120 can determine different priorities of service for voice calls and data calls. In order to determine different priorities of service, each remote user device is assigned a priority based on the nature of use of that remote user device. Each user's priority assignment is associated with the user's mobile identification number (MIN), another identification-type number or device, an application performed by the user, or a device operated by the user. When a remote user device communicates with the node controller 120, the node controller receives priority information associated with the respective remote user device, or can otherwise access the database to retrieve priority information associated with a profile for the remote user device. For example, the MIN associated priorities of each user are stored in the database 122 at the packet switch 102. Mobile telephones, which provide voice call service, can be assigned a relatively high priority. On the other hand, personal digital assistants (PDAs), wireless facsimile machines, wireless e-mail systems, and other devices or applications are assigned a relatively lower priority. In any instance, the node controller 120 calls to the database 122 to retrieve priority information of a user.

While the system 100 shown is described in connection with at least two priorities, high priority for voice and low priority for data, the system 100 also lends itself to multiple priorities. Each lower level of priority offers the opportunity for lower charges by the service provider to customers with low priority needs for transmission of data. Conversely, high priority service rationally brings with it the opportunity to charge more by the service provider.

Multiple priorities can be based on the application being used. For example, if one remote user is using a facsimile application, a relatively higher priority can be assigned to this remote user than to a remote user using an e-mail application. Typically, applications involving voice or large amounts of data will be assigned a higher priority than those applications involving data or relatively little amounts of data. In some instances, there could be multiple priorities within an application. For example, an e-mail application can be subdivided to provide higher and lower levels of priority service, such as in the case of a user identifying particular e-mails with a "high," "medium," or "low" priority. Those e-mails identified with a relatively higher priority receive higher priority service than those with a lower level of priority service.

Priority can be based on a mobile address or other address used to route information to the mobile user. For example, an address can include, but is not limited to, a mobile identification number (MIN), and Internet Protocol (IP) address, or another similar type routing address associated with a remote user.

In addition, a remote user device could be assigned multiple MINs each with a different priority or a mixture of priorities. Such multiple MIN devices could thus provide, for example, three channels of service, one channel of high priority service and two additional channels of lower priority data service. Such devices would have high priority access for data transmission at all times and during off-peak times could use all three channels for enhanced speed data transmission using all three channels together.

In some instances, the system 100 shown can be used to notify large numbers of remote or mobile users in a "broadcast" call-type situation, such as an emergency situation. In these types of instances, an emergency message with a priority of an appropriate level is associated with the emergency call. A broadcast call could be in the form of a voice call or data call. When a broadcast call is placed, the call is provided an appropriate priority for the type of broadcast message being transmitted.

The buffer 118 can be used to store and forward data to further assist with prioritizing delivery of data to remote users. For real-time services such as voice and some types of data (e.g., video conferencing), user satisfaction can be impacted by delays in data transmission. However, for many types of data transmission a few seconds or few minutes does not impact overall user satisfaction. Thus, methods for storing and forwarding data can further assist in implementing prioritization of calls in accordance with the invention.

Using the system 100 shown, voice call service could obtain immediate access to a channel and continuity of connection over the channel for the duration of the voice call. Voice call service can be considered unacceptable by remote users if a remote user cannot acquire a channel quickly and/or if voice calls are dropped during a conversation. By contrast, data call service does not need the same immediacy of access or continuity of connection. An e-mail message or a facsimile document may be delayed for several minutes or even hours without adversely effecting the usefulness of the data call service. Likewise transmission of an e-mail message or a facsimile document can be interrupted and then resumed without adversely effecting the service as long as the resumption can pick up the transmission at the point of interruption.

Figure 2:
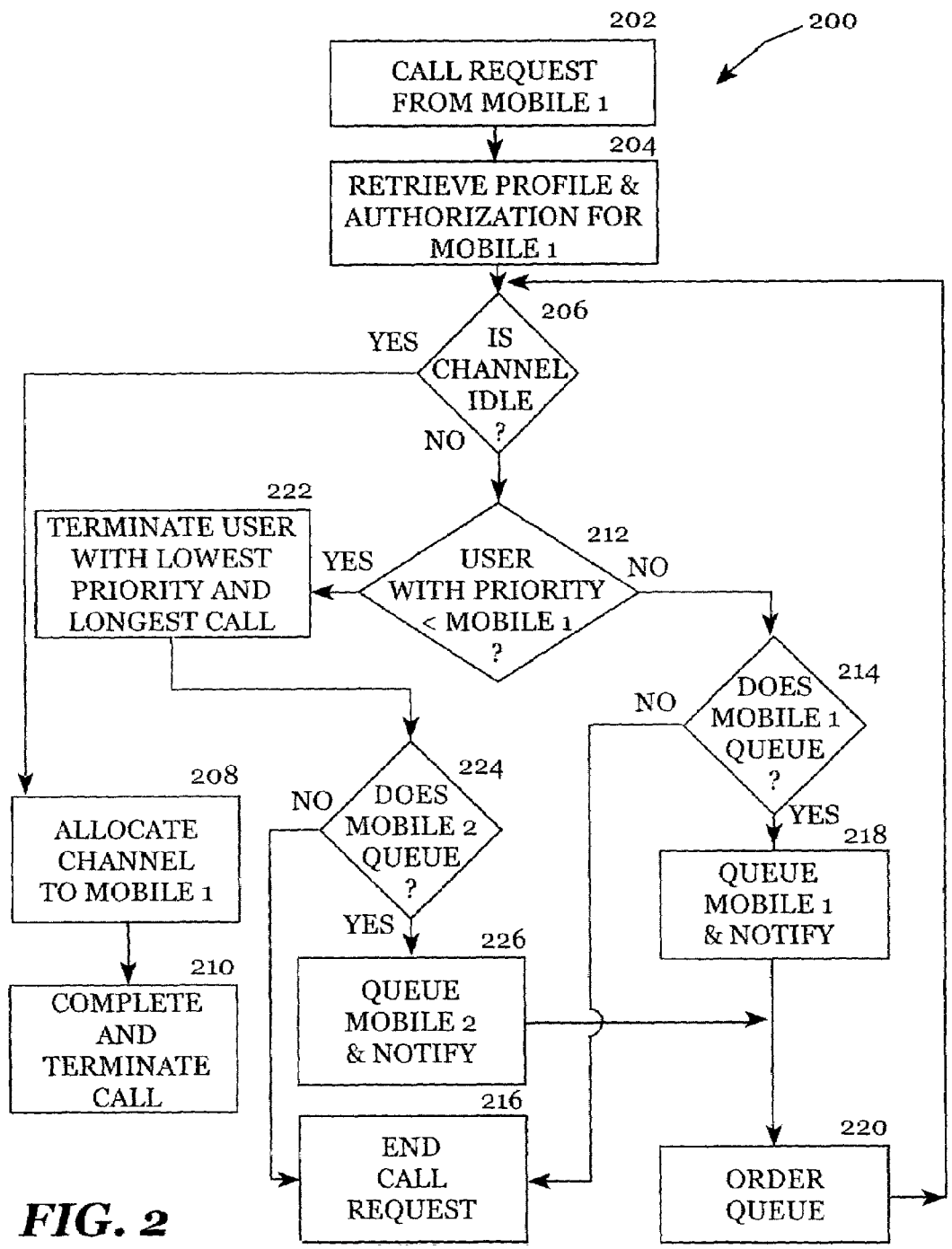
FIG. 2 is a flow diagram illustrating a method for managing network resources in accordance with various embodiments of the invention.
Figure 3A:
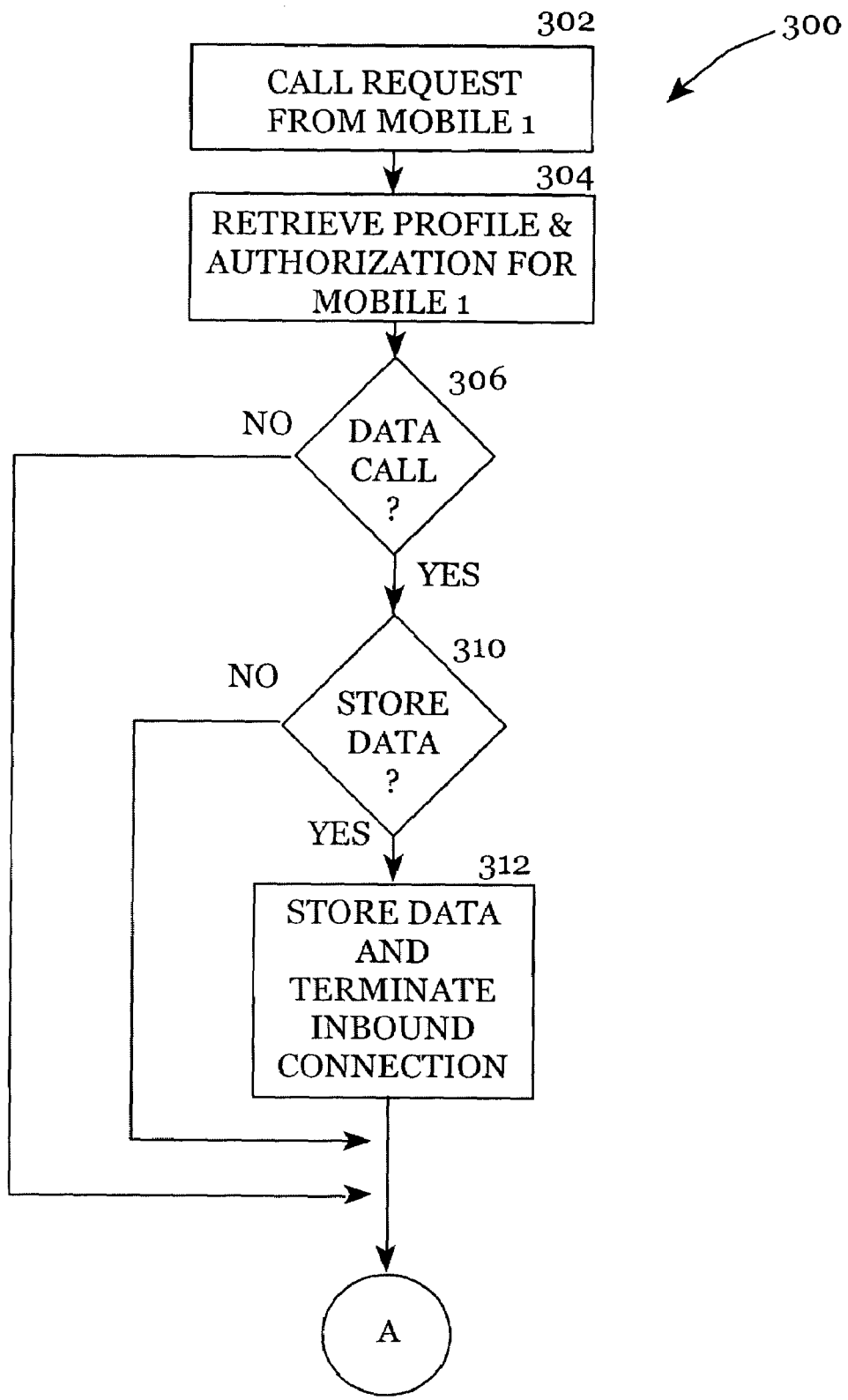
FIG. 3A is a flow diagram illustrating another method in accordance with various embodiments of the invention.
Figure 3B:
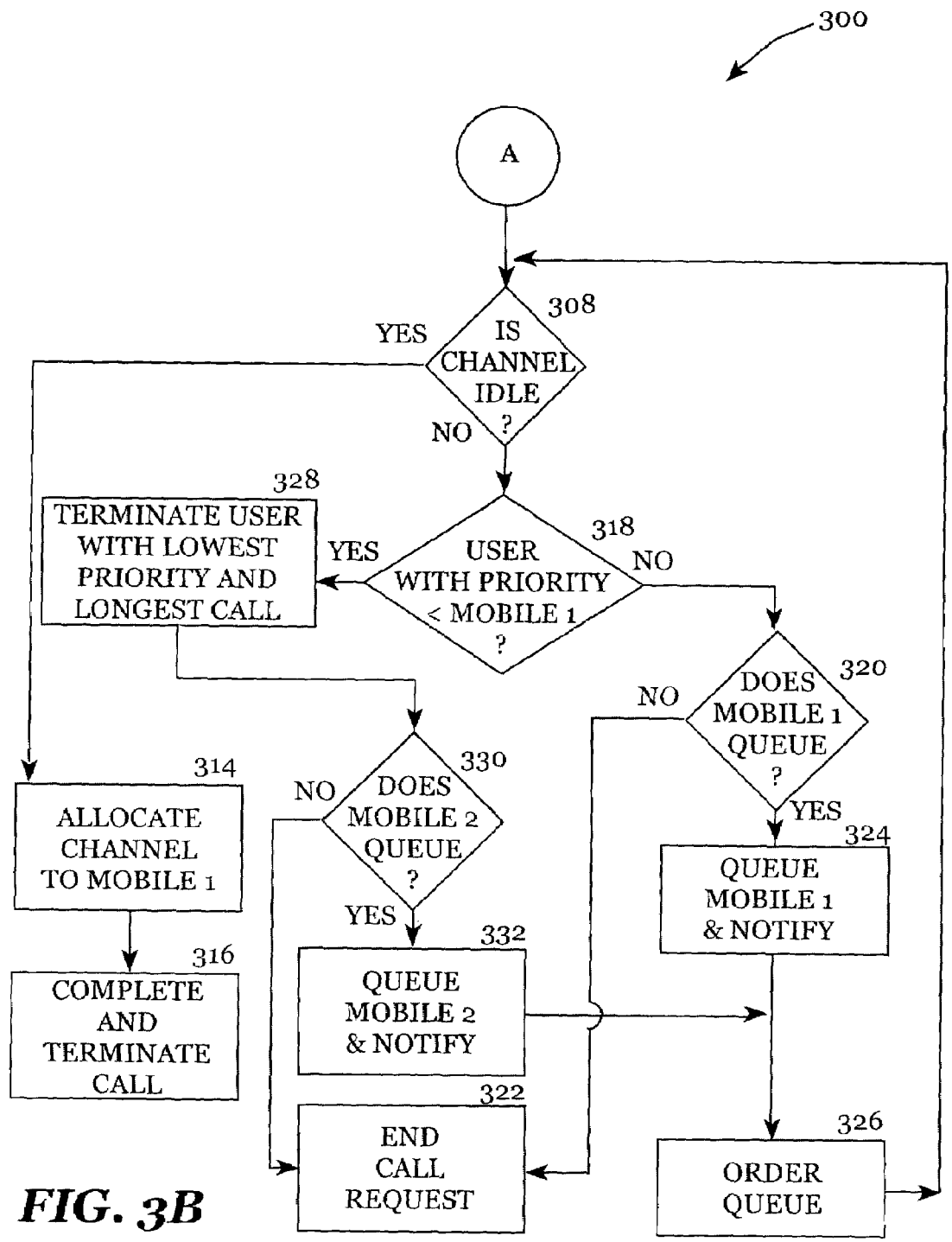
FIG. 3B is a flow diagram illustrating another method in accordance with various embodiments of the invention.

Various methods for managing network resources in accordance with the invention, such as during an incoming call and for terminating a call, can be implemented with the packet-based communications system 100 shown and described in FIG. 1. FIGS. 2, 3A, and 3B illustrate methods for managing network resources such as during an incoming call and for terminating a call. Each of the illustrated methods utilize specific call management logic routines with which an incoming call and a call termination are treated based upon the associated prior and current priorities of respective calls.

Turning to FIG. 2, there is shown a flow diagram showing a method 200 of the invention when a remote user (mobile 1 110) requests service at a particular node 104. The method 200 begins at block 202 with a request for service from mobile 1 in node 104. The request for service is transmitted to the packet switch 102. In some instances, a determination of the type of service requested can be made at block 202. For example, a determination whether a request for service is for voice service, data service, or another type of service can be made. Depending upon the type of service requested, feedback to the caller can be provided, or the request for service can be routed or handled in a particular manner.

Block 202 is followed by block 204, in which the node controller 120 queries the database 122 to determine the priority of service for mobile 1 based on mobile 1's profile and authorization information. Mobile 1's profile and authorization information was provided to the packet switch 102 when mobile 1 110 first registered with the service provider for the packet-based communications system 100. After acquiring the profile and authorization information including the priority for mobile 1 110 from the database 122 at block 204, the method 200 proceeds to decision block 206.

At decision block 206, the node controller 120 of the packet switch 102 ascertains whether there is an idle channel available to service the request for service from mobile 1 110. If at decision block 206, the node controller 120 of the packet switch 102 determines that there is an idle channel at node 104, the method 200 follows the "yes" branch to block 208, and the idle channel is assigned to mobile 1 110 without regard to mobile 1's priority. When the call of mobile 1 110 is completed, the method 200 proceeds from block 208 to block 210 where the completed call is terminated for mobile 1 110.

Note that the node controller 120 can also assess other network resources such as all available radio channels accessible from or by mobile 1 110. Other network resources include, but are not limited to, channels at one or more cell sites in communication with node 104, and channels associated with other nodes in communication with the network 108, similar to those associated with node 104.

If on the other hand there is not an idle channel available at decision block 206, the method 200 follows the "no" branch from decision block 206 to decision block 212. At decision block 212, the method 200 determines if there is a current remote user in communication with node 104 that has a priority lower than mobile 1's priority. Note that a comparison is made between the priority associated with mobile 1 110 and a priority associated with at least one current remote user. Preferably, mobile 1's priority is compared to all current remote users in communication with the node 104. If all the users have a priority equal to or higher than mobile 1's priority, the method 200 follows the "no" branch to decision block 214.

At decision block 214, based on the profile and authorization information for mobile 1, the node controller 120 determines whether mobile 1's call request should be queued for later connection. If mobile 1's profile and authorization information does not authorize queuing, the method 200 follows the "no" branch to block 216 where mobile 1's call request is ended. Mobile 1 110 may not want to queue its call request if, for example, mobile 1 110 is a low priority voice service. Such a low priority voice caller expects to be precluded from the network 108 from time to time, but such a voice caller probably does not want to wait in a queue of undermined length. Instead such a low priority voice caller may simple want to place the call later.

On the other hand, if mobile 1 110 is a low priority data service, such a data caller may want to queue his call for later service. If the node controller 120 determines at decision block 214 that mobile 1 110 has registered with the service provider for queuing, the method then follows the "yes" branch to block 218.

At block 218 the call request from mobile 1 110 is put into a queue to await the next available channel in node 104. At block 218, the node controller 120 also notifies mobile 1 110 that its call request has been queued so that mobile 1 110 does not continue to send new call requests to the packet switch 102.

Alternatively, the call request from mobile 1 110 may be handled at block 218 if a request for data service is made. For example, if an incoming call requests transmission of data, data can be stored in buffer 118 for subsequent transmission at a later time. Still the call request may be queued as described in block 220, and the data transmitted when the call request is subsequently handled by the method 200.

Block 218 is followed by block 220, in which the queue is ordered by priority and time of wait so that the call request with the highest priority and the longest waiting time is at the head of the queue and will be assigned the next available channel in node 104. Note that in other embodiments of the invention, the queue can be ordered based on other criteria based on priority. For example, the instant call request can be placed at the head of the queue if the call request has or is provided a sufficient priority.

After ordering the queue at block 220, the method 200 returns to decision block 206 to seek the next available channel in node 104 for the call request for the remote user at the head of the queue.

If, however, at decision block 212, the node controller 120 determines that a channel in node 104 is being used by a remote user, such as mobile 2 112, with a priority lower than mobile 1 110, the method 200 follows the "yes" branch to block 222.

At block 222, the node controller 120 terminates mobile 2's lower priority data call, and at block 208, the node controller 120 allocates the vacated channel to mobile 1 110. Mobile 1's call is complete and terminated at block 210.

The selection of mobile 2 112 for call termination at block 222 is based on the priority of mobile 2 112 and on the duration of mobile 2's call at the time of termination. For example, if several current remote users have the same priority as mobile 2 112, which is priority is lower than mobile 1 110, the node controller 120 will terminate the remote user that has been connected for the longest time. In this case, mobile 2 112 is assumed to be the call with the longest duration of those users with the same priority as mobile 2 112. As part of the termination process of mobile 2 112, the software or other device or method that controls the transmission of data to and from mobile 2 112 will recognize the termination and mark the point in the transmission where call termination occurred. On resumption of the call to mobile 2 112, the software or other device or method will be able to pick up the data transfer at the point of termination.

Alternatively, transmission of data to and from mobile 2 112 may stored in buffer 118 for subsequent transmission at a later time.

After the call of mobile 2 112 has been terminated at block 222, the method 200 proceeds to decision block 224 where, based on mobile 2's profile and authorization information, the node controller 120 determines whether a request by mobile 2 112 for resumption of its call should be put in the queue. If mobile 2's profile and authorization information does not authorize queuing, the method 200 follows the "no" branch from decision block 224 to block 216 where mobile 2's call request to resume is ended.

Alternatively, the method follows the "yes" branch from decision block 224 to block 226 where the node controller 120 puts a request to resume the terminated call of mobile 2 112 into the queue. At block 226, the node controller 120 also notifies mobile 2 112 that its call has been queued so that mobile 2 112 will not try to reestablish its call by new call requests to the packet switch 102.

The queue is ordered at block 220 as previously described, and the ordered call requests in the queue wait for the next available channel in node 104 as indicated by the return path to decision block 206. Note that in other embodiments of the invention, the queue can be ordered based on other criteria based on priority. For example, the instant call request can be placed at the head of the queue if the call request has or is provided a sufficient priority.

If the terminated call for mobile 2 112 was transferring data to mobile 2 112 at the time of termination, the node controller 120 may maintain the connection to the network 108 for resumption of data transfer when the call to mobile 2 112 is resumed on an idle channel. Alternatively, the node controller 120 may store all of the data from the caller in buffer 118, terminate the call from the network 108, and transfer the data from the buffer 118 to mobile 2 112 upon reacquisition of an idle channel for mobile 2 112. Such storing and forwarding of data will be described in greater detail in connection FIG. 3A. If on the other hand, the terminated call of mobile 2 112 was transferring data from mobile 2 112 to a caller on the network 108, the node controller 120 will maintain the connection to the network 108 until a channel for mobile 2 112 is reacquired and the transmission is complete.

Turning to FIGS. 3A and 3B, flow diagrams show another method 300 of the invention when a caller or calling party 106 from the network 108 requests service to the remote user (mobile 1 110) in communication with node 104. For an incoming call, at least one method implementing call management logic can include elements such as utilizing the priority profile of the called number; determining the type of call (voice or data); and/or providing the option to store (or buffer) the incoming data for later delivery. The call management logic implementing some or all of these elements can be combined as needed, and can be applied to packet-based communications systems and associated services, such as SMS, GPRS, EDGE, 1XRTT services, as well as the system 100 shown in FIG. 1. For some packet-based communications systems and associated services, the use of queuing (i.e., suspend transmission) rather than terminating a session is an option.

The method 300 begins at block 302 with a request for service from the network 108 for a call to mobile 1 110 via node 104. The request for service to mobile 1 110 is transmitted from the network 108 to the packet switch 102. After receiving the call request at block 302, the method 300 proceeds to block 304.

At block 304, the node controller 120 queries the database 122 to determine the priority of service for mobile 1 110 based on the profile and authorization information for mobile 1's MIN. Based on the priority of mobile 1 110, the node controller 120 determines at decision block 306 whether the call is a data transfer call. If at decision block 306 the node controller 120 determines that the call is not a data transfer call, the method 300 follows the "no" branch to decision block 308 described below and shown in FIG. 3B.

If at decision block 306 the node controller 120 determines that the call is a data transfer call, the method 300 follows the "yes" branch to decision block 310. At decision block 310, the node controller 120 determines whether the data should be stored in the buffer 118. The decision to store or not to store data at decision block 310 is based on the node controller's estimation of the length of wait before a connection can be made to mobile 1 110. If data is not stored, the method 300 follows the "no" branch to decision block 308 (FIG. 3B) and retains the connection to the inbound caller on the network 108. If the data is stored at decision block 310, the method 300 follows the "yes" branch to block 312.

At block 312, the inbound data from the network 108 is stored in buffer 118, and the connection from the network 108 is terminated. The use of buffer 118 and block 312 is optional, and the packet switch 102 could simply maintain the connection to the network 108 until the data transmission to mobile 1 110 is complete. After the data is stored in buffer 118 at block 312, the method 300 proceeds to block 308 (FIG. 3B).

Referring now to FIG. 3B, at block 308, the node controller 120 of the packet switch 102 ascertains whether there is an idle channel available for servicing the call request to mobile 1 110. If there is an idle channel in node 104, the method 300 follows the "yes" branch to block 314, and the idle channel is allocated to mobile 1 110 without regard to the priority of mobile 1 110. Once the call to mobile 1 110 has been completed, the method 300 proceeds to block 316 where the call to mobile 1 110 is terminated and the data for mobile 1 110 is emptied (marked to be overwritten) from the buffer 118 if applicable.

Turning back to decision block 308, if there is no idle channel available, the method 300 follows the "no" branch to decision block 318. At decision block 318, the method 300 determines if there is a current remote user in node 104 that has a priority lower than mobile 1's priority. If all the users have a priority equal to or higher than mobile 1's priority, the method 300 follows the "no" branch to block 320. At block 320, the node controller 120 determines from mobile 1's profile and authorization information and from the handling of the inbound data whether the call request to mobile 1 110 should be queued. If the inbound data was not stored at block 312 (shown in FIG. 3A), then the call request to mobile 1 110 may not be queued, and the method 300 follows the "no" branch to block 322 where the inbound call request is ended, and the inbound caller is notified that no connection was made to mobile 1 110. If the inbound data was stored at block 312 (FIG. 3A), then the call request to mobile 1 110 will be placed in an order queue by the node controller 120, and the method 300 will follow the "yes" branch to block 324.

At block 324 the call request to mobile 1 110 is put into the ordered queue, mobile 1 110 is notified that it has an inbound queued call request awaiting the next available channel in node 104.

Block 324 is followed by block 326, in which the queue is ordered by priority and time of wait so that the call request with the highest priority and the longest waiting time is moved to the head of the queue for assignment to the next available channel in node 104. Note that in other embodiments of the invention, the queue can be ordered based on other criteria based on priority. For example, the instant call request can be placed at the head of the queue if the call request has or is provided a sufficient priority. After ordering the queue at block 326, the method 300 returns to decision block 308 to seek the next available channel in node 104 for the call request at the head of the ordered queue.

If, however, at decision block 318, the node 120 determines that a channel in node 104 is being used by a remote user, such as mobile 2 112, with a priority lower than mobile 1 110, the method 300 follows the "yes" branch to block 328. At block 328, the node controller 120 terminates mobile 2's lower priority data call, and at block 314 allocates the vacated channel to mobile 1. The selection of mobile 2 112 for call termination is based on the priority of mobile 2 112 and on the duration of mobile 2's call at the time of termination. As part of the termination process for mobile 2 112, the software that controls the transmission of data to and from mobile 2 112 will recognize the termination and mark the point in the transmission where call termination occurred. On resumption of the call to mobile 2, the software will pick up the data transfer at the point of termination.

After the call of mobile 2 112 has been terminated at block 328, the method 300 proceeds to decision block 330 where the node controller 120 determines whether mobile 2's request to resume its connection should be queue or ended. If the call request to resume is to be ended, the method 300 follows the "no" branch to block 322 where the node controller 120 ends the request of mobile 2 112 to resume its terminated call. Alternatively, the method 300 follows the "yes" branch from decision block 330 to block 332 where the node controller 120 puts mobile 2's request to resume its terminated call into the ordered queue and notifies mobile 2 112 that its request to resume has been queued.

Block 332 is followed by block 326, in which the queue is ordered, and the call requests in the queue wait for the next available channel in node 104 for the call request at the head of the ordered queue as indicated by the return path to decision block 308.

Based on the foregoing it should also be appreciated that the invention also contemplates multiple priorities for multiple levels of service. For example, voice callers could be given multiple levels to distinguish emergency services from other voice calls. On a lower priority level, data transmissions could be further subdivided, for example, to provide a higher priority for facsimile transmission than for e-mail. Further, e-mail could be further subdivided to provide higher and lower levels of priority service. Priority can be based on a mobile address such as a MIN, IP (Internet Protocol), or any other address used to route information to a mobile user. Each priority could be offered to any mobile user 110, 112, 114 at a separate cost or billing rate by a communications service provider. The ordering of the queue in the packet switch 102 assures that the various requests for service for each calling device is serviced in the proper priority order as idle channels become available.

While the invention has been described in connection with a packet-based communications system, the invention is equally applicable to any packet-based communications system having a packet switch for controlling access to a network access node with a limited number of access channels for serving remote users. Alternatively, the invention is applicable to a switched communications system having a switch for controlling access to a network access node with a limited number of access channels for serving remote users. Digital loop carriers are another example of such a switched communications system environment in which the invention finds applicability.

In a communications network such as a packet-based communications network or switched communications network, a notification can be a message generated by a switch such as a packet switch, and sent via a control channel to a mobile or remote device. As described in the methods 200 of FIG. 2 and 300 of FIG. 3B, and implemented by the system 100 shown in FIG. 1, a packet switch 102 can notify a mobile or remote device 110, 112, 114. Specifically, in block 218 of FIG. 2, and also in block 324 of FIG. 3B, a notification is sent to a subscriber or remote user associated with a mobile or remote device, such as mobile 1 110. Alternatively, as shown in block 226 of FIG. 2 and also in block 332 of FIG. 3B, a notification can be sent to a subscriber or remote user associated with a mobile or remote device, such as mobile 2 112. Other mobile or remote devices can receive a notification in this or other embodiments of the invention.

In a notification, information can be provided to the subscriber or remote user regarding the activities of the packet switch 102 and/or network 108. That is, the packet switch 102 and/or network 108 generates a message including information for the subscriber and sends the message to an application, mobile device, or end-user so that the subscriber can take appropriate action. Message information can include, but is not limited to, a termination alert, a queuing placement, duration of an expected delay, time-of-day, redirection regarding better frequency, service level, service type, pricing, recommended retry time, and an alternative service provider. Other types of notification to a mobile or remote device with various message information can be implemented in accordance with the invention.

For example, a notification can inform a user of queuing status for a call. As shown in block 218 of FIG. 2 and in block 324 of FIG. 3B, a notification can be sent by the packet switch 102 to the mobile or remote device such as mobile 1 110. The notification can include a status message implemented in a predefined "CALL_PROCEEDING" field sent via a control channel to the mobile or remote device. The status message could include the text, "Queue 4", signifying that the request has been placed in a queue, and that the current level assigned to the request is the fourth level from the top level, with the first level being the highest priority level.

Shorter or longer messages may be generated in a "CALL_PROCEEDING" field sent via a control channel to the mobile or remote device. Generally, it is preferable to provide as much information as possible regarding the activities in the network to a user associated with a remote or mobile device so that the user can take appropriate action.

Alternatively, a status message could include the listing of all queues by service level and placement of a service request. For example, a status message could include all or a portion of the following information: Q1-3, Q2-2*, Q3-5, . . . Q(n)-(x)*, wherein "Q(n)" represents a service level queue for number 'n,' "x" is the number of requests in a queue for a particular service level, and "*" represents the current placement of the particular service request.

Notification can be implemented prior to call termination and queuing. In many instances involving call termination for lack of network resources and/or higher priority callers, the system determines a call to be terminated. The invention provides notification to this remote user prior to terminating and queuing the call. In some instances, message information can include an interactive query to obtain or otherwise receive information from the subscriber. Interactive features can guide or otherwise provide a remote user with various options to increase or decrease the remote user's priority. For example, a remote user can be prompted by a message notifying the user that the call will be terminated unless the remote user increases the class of service for the call, from class of service 1 to class of service 2. If the remote user accepts an increase in class of service to avoid termination of the call, the remote user can be charged or otherwise billed by the service provider for the increase in class of service for the call. Alternatively, a remote user can be prompted to increase the priority of the call based on the nature of the call, such as an emergency situation. The remote user could transmit a selected option indicating the call is for an emergency situation, and increase the priority of the call as needed. In other instances, the mobile device can be programmed to automatically request a higher priority to be associated with a call request. However, in most cases, if a call is made to a predetermined directory number for emergency services such as "911" or "1-800-555-1212," the priority of the call can automatically be increased as needed. Information obtained from or received from the subscriber can be sent from the mobile or remote device back to the packet switch 102. In these types of interactions, improved Quality of Service (QoS) can result when the subscriber can obtain information from the network 108, and then take appropriate action or otherwise respond to the information.

Figure 4:
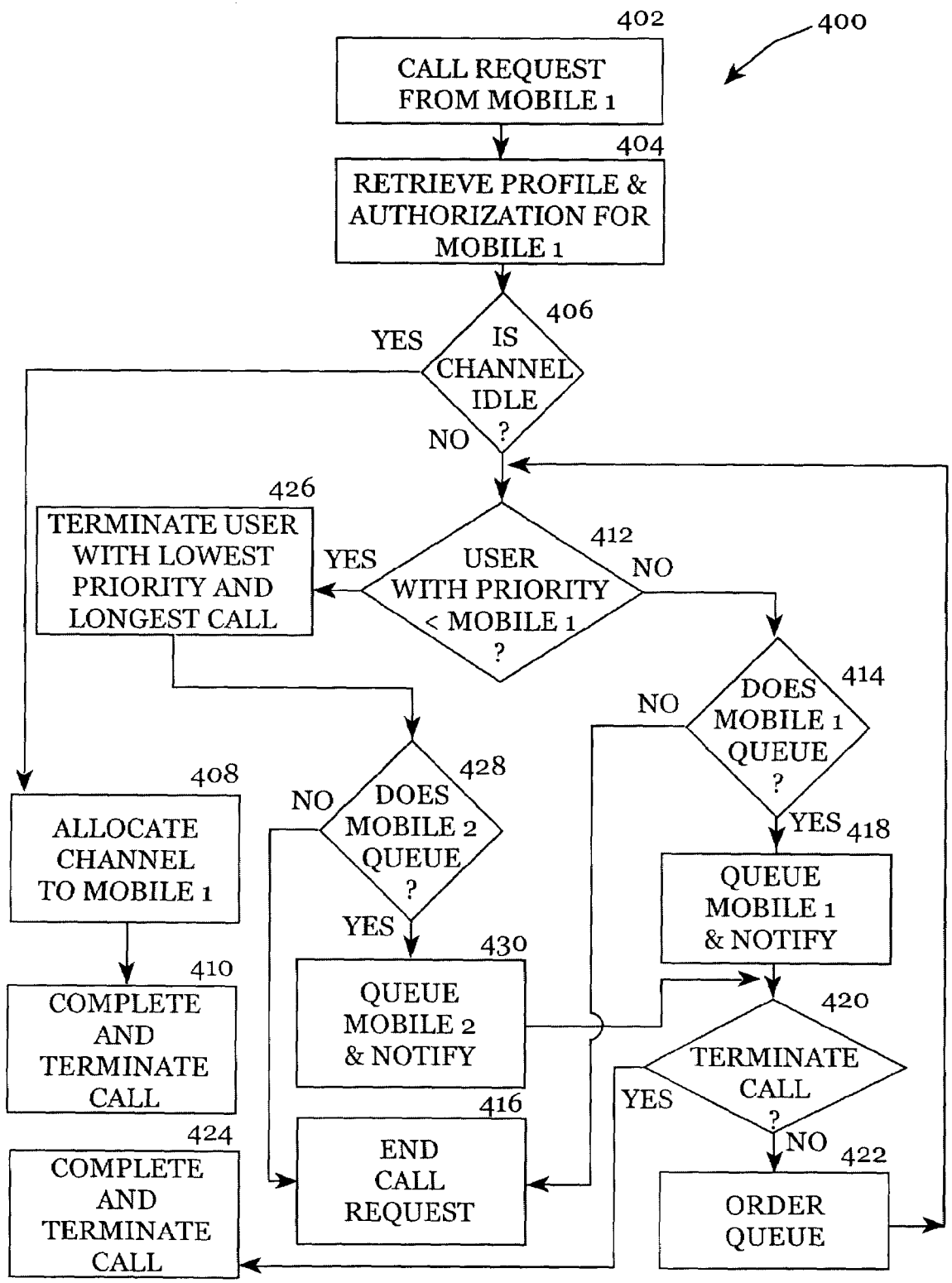
FIG. 4 is a flow diagram illustrating another method in accordance with various embodiments of the invention.
Figure 5A:
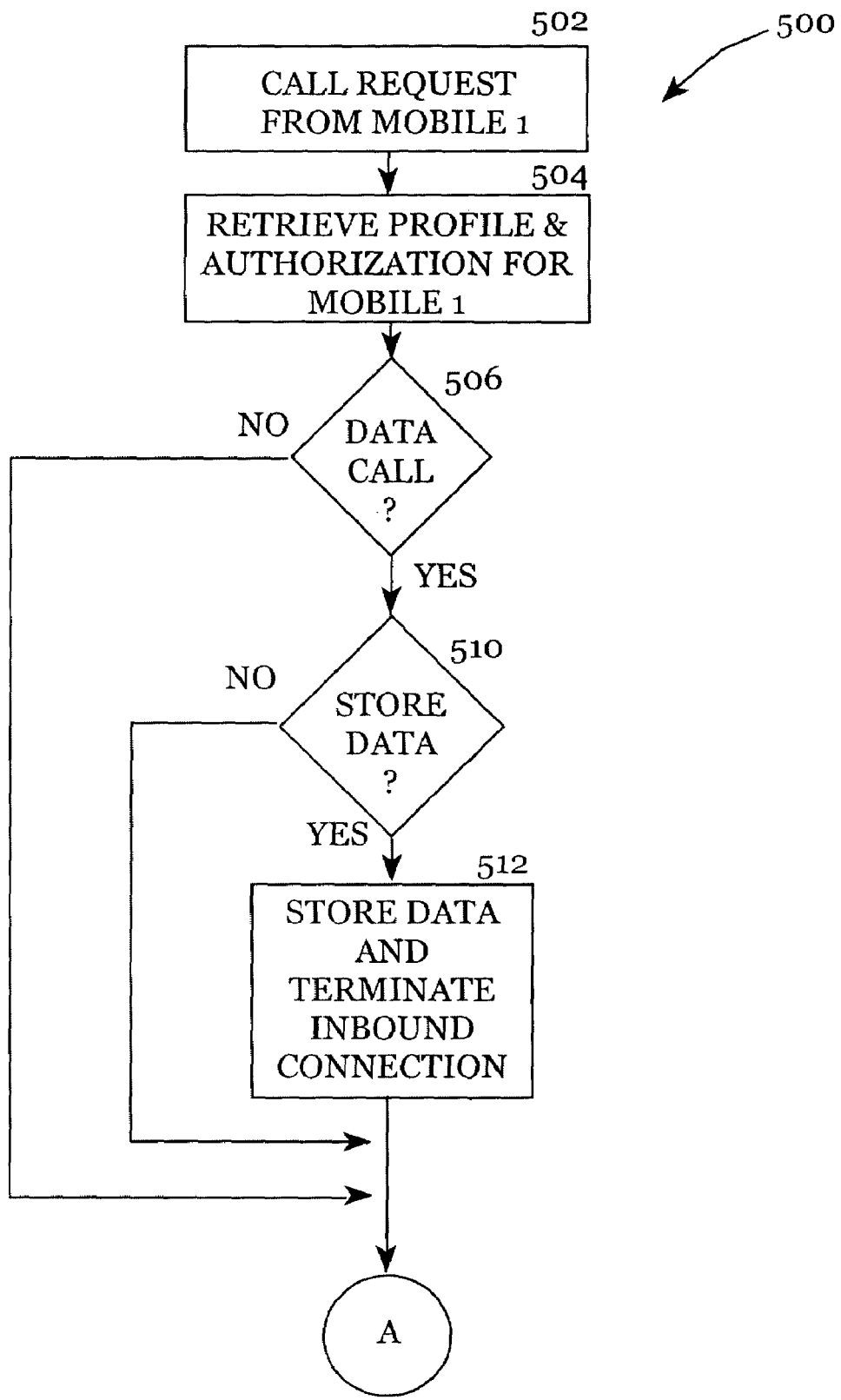
FIG. 5A is a flow diagram illustrating another method in accordance with various embodiments of the invention.
Figure 5B:
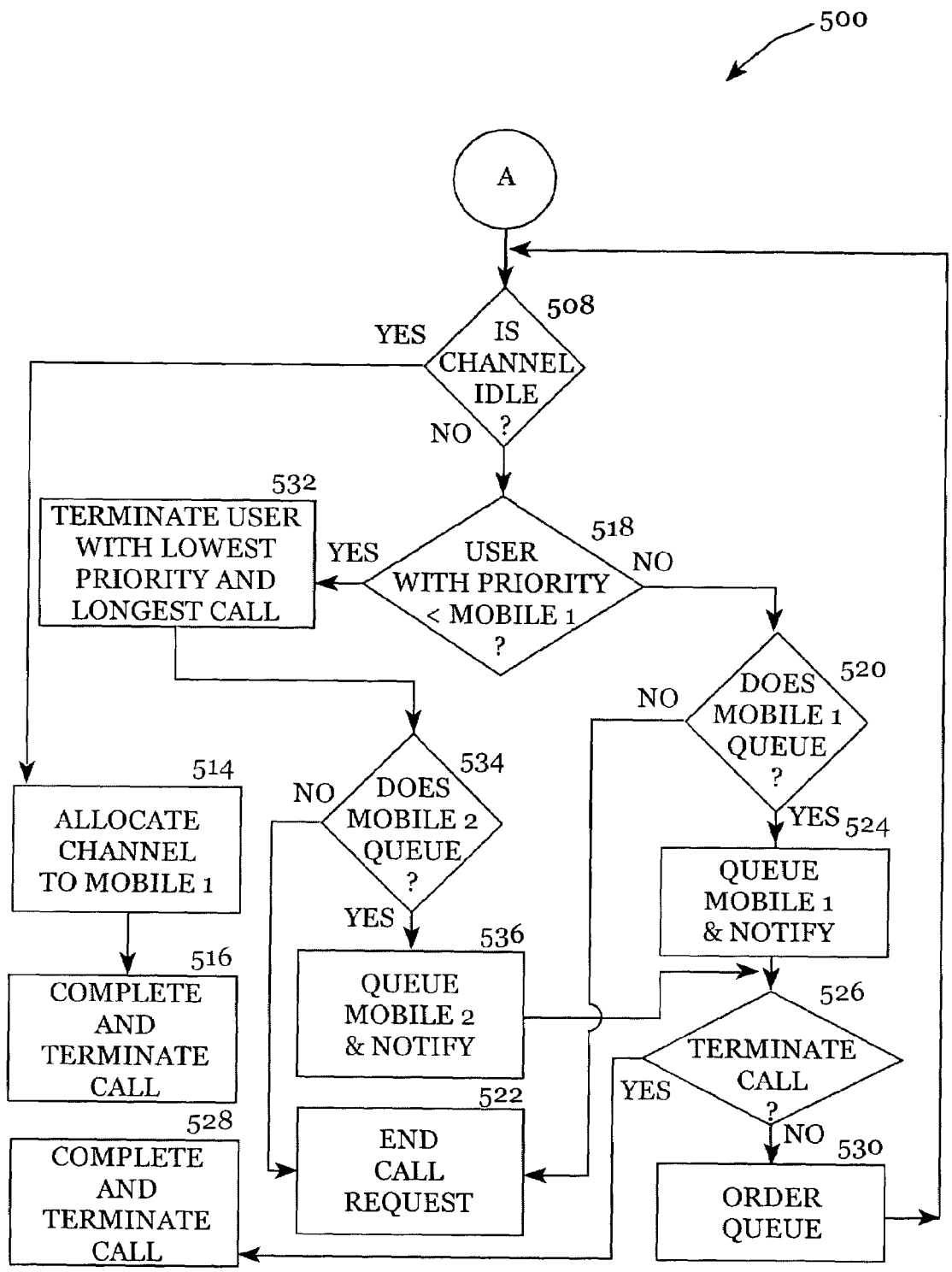
FIG. 5B is a flow diagram illustrating another method in accordance with various embodiments of the invention.

FIGS. 4, 5A, and 5B illustrate methods associated with a notification in accordance with other embodiments of the invention. In the following FIGS. 4, 5A, and 5B, a notification such as a termination alert is provided to a mobile or remote device. The notification described in the following examples also provides a query to a user of the mobile or remote device, and in response to the query, the user can send information back to the packet switch.

Turning to FIG. 4, a flow diagram illustrates an associated method of notification in accordance with various embodiments of the invention. FIG. 4 is similar to the method shown in FIG. 2 when the remote user 110 (mobile 1) requests service from within the node 104, except method 400 of FIG. 4 provides additional elements of notification. The method 400 of FIG. 4 begins at block 402 with a request for service from mobile 1 110 in communication with node 104. The request for service is transmitted to the packet switch 102.

Block 402 is followed by block 404, in which the node controller 120 queries the database 122 to determine the priority of service for mobile 1 110 based on mobile 1's profile and authorization information. Mobile 1's profile and authorization information was provided to the packet switch 102 when mobile 1 110 first registered with the service provider for the communications system 100. After acquiring the profile and authorization information including the priority for mobile 1 110 from the database at block 404, the method 400 proceeds to decision block 406.

At decision block 406, the node controller 120 of the packet switch 102 ascertains whether there is an idle channel available to service the request for service from mobile 1 110. If at decision block 406, the node controller 120 of the packet switch 102 determines that there is an idle channel in node 102, the method 400 follows the "yes" branch to block 408 and the idle channel is assigned to mobile 1 110 without regard to mobile 1's priority. When the call of mobile 1 110 is completed, the method 400 proceeds to block 410 where the completed call is terminated for mobile 1 110.

If on the other hand there is not an idle channel available at decision block 406, the method 400 follows the "no" branch from decision block 406 to decision block 412. At decision block 412, the method 400 determines if there is a current remote user in communication with node 104 that has a priority lower than mobile 1's priority. If all the users have a priority equal to or higher than mobile 1's priority, the method 400 follows the "no" branch to decision block 414.

At decision block 414, based on the profile and authorization information for mobile 1 110, the node controller 120 determines whether mobile 1's call request should be queued for later connection. If mobile 1's profile and authorization information does not authorize queuing, the method 400 follows the "no" branch to block 416 where mobile 1's call request is ended. Mobile 1 110 may not want to queue its call request if, for example, mobile 1 110 is a low priority voice service. Such a low priority voice caller can expect to be precluded from the network from time to time, but such a voice caller probably does not want to wait in a queue of undermined length. Instead such a low priority voice caller may simple want to place the call later.

On the other hand, if mobile 1 110 is a low priority data service, such a data caller may want to queue his call for later service. If the node controller 120 determines at block 414 that mobile 1 110 has registered with the service provider for queuing, the method 400 then follows the "yes" branch to block 418. At block 418 the call request from mobile 1 110 is put into a queue to await the next available channel in node 104. At block 418, the node controller 120 also notifies mobile 1 110 that its call request has been queued so that mobile 1 110 does not continue to send new call requests to the packet switch 102.

Block 418 is followed by decision block 420, in which a determination is made whether the call is to be terminated. Typically, a notification sent to mobile 1 110 queries a remote user whether the call should be terminated. The notification can be a message to the remote user including a query prompting the remote user to accept or decline termination of the call. In any event, a response from the remote user and/or mobile 1 is sent back to the packet switch 102 for appropriate call handling. If the remote user does not accept call termination, then the "no" branch is followed to block 422.

At block 422, the queue is ordered by priority and time of wait so that the call request with the highest priority and the longest waiting time is at the head of the queue and will be assigned the next available channel associated with node 104. After ordering the queue at block 422, the method 400 returns to block 406 to seek the next available channel associated with node 104 for the call request for the remote user at the head of the queue.

If, however, the remote user accepts call termination at decision block 420, then the "yes" branch is followed to block 424 where the method 400 terminates the call.

If, however, at block 412, the node controller 120 determines that a channel in node 104 is being used by a remote user, such as mobile 2 112, with a priority lower than mobile 1 110, the method 400 follows the "yes" branch to block 426. At block 426, the node controller 120 terminates mobile 2's lower priority data call, and at block 408, the node controller 120 allocates the vacated channel to mobile 1 110. Mobile 1's call is complete and terminated at block 410.

The selection of mobile 2 for call termination at block 426 is based on the priority of mobile 2 112 and on the duration of mobile 2's call at the time of termination. For example, if several current remote users have the same priority as mobile 2 112, which is priority is lower than mobile 1 110, the node controller 120 will terminate the remote user that has been connected for the longest time. In this case mobile 2 112 is assumed to be the call with the longest duration of those users with the same priority as mobile 2 112. As part of the termination process of mobile 2 112, the software or device or method that controls the transmission of data to and from mobile 2 112 will recognize the termination and mark the point in the transmission where call termination occurred. On resumption of the call to mobile 2 112, the software or device or method will be able to pick up the data transfer at the point of termination.

After the call of mobile 2 112 has been terminated at block 426, the method 400 proceeds to decision block 428 where, based on mobile 2's profile and authorization information, the node controller 120 determines whether a request by mobile 2 112 for resumption of its call should be put in the queue. If mobile 2's profile and authorization information does not authorize queuing, the method 200 follows the "no" branch from decision block 428 to block 416 where mobile 2's call request to resume is ended. Alternatively, the method follows the "yes" branch from decision block 428 to block 430 where the node controller 120 puts a request to resume the terminated call of mobile 2 112 into the queue. At block 430, the node controller 120 also notifies mobile 2 112 that its call has been queued so that mobile 2 112 will not try to reestablish its call by new call requests to the packet switch 102.

Block 430 is followed by decision block 420, in which a determination is made whether the call is to be terminated. Typically, a notification sent to mobile 2 112 queries a remote user whether the call should be terminated. The notification can be a message to the remote user including a query prompting the remote user to accept or decline termination of the call. In any event, a response from the remote user and/or mobile 2 112 is sent back to the packet switch 102. If the remote user accepts call termination, then the "yes" branch is followed to block 424, where the call is terminated.

If the user does not accept call termination at decision block 420, then the "no" branch is followed to block 422. As previously described, the queue is ordered, and the ordered call requests in the queue wait for the next available channel in node 104 as indicated by the return path to decision block 406. At decision block 406, the method 400 seeks the next available channel associated with node 104 for the call request for the remote user at the head of the queue.

If the terminated call for mobile 2 112 was transferring data to mobile 2 112 at the time of termination, the node controller 120 may maintain the connection to the calling party 106 for resumption of data transfer when the call to mobile 2 112 is resumed on an idle channel. Alternatively, the node controller 120 may store all of the data from the caller in buffer 118, terminate the call from the network 108, and transfer the data from the buffer 118 to mobile 2 112 upon reacquisition of an idle channel for mobile 2 112. Such storing and forwarding of data will be described in greater detail in FIG. 5A. If on the other hand the terminated call of mobile 2 112 was transferring data from mobile 2 112 to a caller on the network 108, the node controller 120 will maintain the connection to the network 108 until a channel for mobile 2 112 is reacquired and the transmission is complete.

FIGS. 5A and 5B illustrates a flow diagram showing another method of notification in accordance with various embodiments of the invention. FIGS. 5A and 5B illustrate a method 500 similar to the method in 300 shown in FIGS. 3A and 3B when a caller from network 108 requests service to the remote user 110 (mobile 1) within the node 104. The method 500 of the invention begins at block 502 with a request for service from the network 108 for a call to mobile 1 in node 104. The request for service to mobile 1 is transmitted from the network 108 to the packet switch 102. After receiving the call request at block 502, the method 500 proceeds to block 504.

At block 504, the node controller 120 queries the database 122 to determine the priority of service for mobile 1 based on the profile and authorization information for mobile 1's MIN. Based on the priority of mobile 1, the node controller 120 determines at decision block 506 whether the call is a data transfer call. If at decision block 506 the node controller 120 determines that the call is not a data transfer call, the method follows the "no" branch to decision block 508 described and shown below in FIG. 5B.

If at decision block 506 the node controller 120 determines that the call is a data transfer call, the method follows the "yes" branch to block 510. At block 510, the node controller 120 determines whether the data should be stored in the buffer 118. The decision to store or not to store data at block 510 is based on the node controller's estimation of the length of wait before a connection can be made to mobile 1 110. If data is not stored, the method 500 follows the "no" branch to decision block 508 (FIG. 5B) and retains the connection to the inbound caller on network 108. If the data is stored at block 510, the method 500 follows the "yes" branch to block 512.

At block 512, the inbound data from the network 108 is stored in buffer 118, and the connection from the network 108 is terminated. The use of buffer 118 and block 512 is optional, and the packet switch 102 could simply maintain the connection to the network 108 until the data transmission to mobile 1 110 is complete. After the data is stored in buffer 118 at block 512, the method 500 proceeds to block 508 (FIG. 5B).

At decision block 508, the node controller 120 of the packet switch 102 ascertains whether there is an idle channel available for servicing the call request to mobile 1 110. If there is an idle channel in node 104, the method 500 follows the "yes" branch to block 514, and the idle channel is allocated to mobile 1 110 without regard to the priority of mobile 1 110. Once the call to mobile 1 110 has been completed, the method 500 proceeds to block 516 where the call to mobile 1 110 is terminated and the data for mobile 1 110 is emptied (marked to be overwritten) from the buffer.

If there is no idle channel available, the method 500 follows the "no" branch to decision block 518. At decision block 518, the method 500 determines if there is a current remote user in node 104 that has a priority lower than mobile 1's priority. If all the users have a priority equal to or higher than mobile 1's priority, the method follows the "no" branch to block 520. At block 520, the node controller 120 determines from mobile 1's profile and authorization information and from the handling of the inbound data whether the call request to mobile 1 110 should be queued. If the inbound data was not stored at block 512 in FIG. 5A, then the call request to mobile 1 110 may not be queued, and the method 500 follows the "no" branch to block 522 where the inbound call request is ended, and the inbound caller is notified that no connection was made to mobile 1 110. If the inbound data was stored at block 512 in FIG. 5A, then the call request to mobile 1 110 will be placed in an order queue by the node controller 120, and the method 500 will follow the "yes" branch to block 524.

At block 524 the call request to mobile 1 110 is put into the ordered queue, mobile 1 110 is notified that it has an inbound queued call request awaiting the next available channel in node 104.

Block 524 is followed by decision block 526, in which a determination is made whether the call is to be terminated. Typically, a notification sent to mobile 1 110 queries a remote user whether the call should be terminated. The notification can be a message to the remote user including a query prompting the remote user to accept or decline termination of the call. In any event, a response from the remote user and/or mobile 1 is sent back to the packet switch. If the remote user accepts call termination, then the "yes" branch is followed to block 528 where the method 500 terminates the call.

If the user does not accept call termination at decision block 526, then the "no" branch is followed to block 530 where the queue is ordered.

At block 530 the queue is ordered by priority and time of wait so that the call request with the highest priority and the longest waiting time is moved to the head of the queue for assignment to the next available channel in node 104. After ordering the queue at block 530, the method 500 returns to block 508 to seek the next available channel in node 104 for the call request at the head of the ordered queue.

If, however, at block 518, the node controller 120 determines that a channel in node 104 is being used by a remote user, such as mobile 2 112, with a priority lower than mobile 1 110, the method 500 follows the "yes" branch to block 532. At block 532, the node controller 120 terminates mobile 2's lower priority data call, and at block 514 allocates the vacated channel to mobile 1 110. The selection of mobile 2 112 for call termination is based on the priority of mobile 2 112 and on the duration of mobile 2's call at the time of termination. As part of the termination process for mobile 2 112, the software that controls the transmission of data to and from mobile 2 112 will recognize the termination and mark the point in the transmission where call termination occurred. On resumption of the call to mobile 2 112, the software will pick up the data transfer at the point of termination.

After the call of mobile 2 has been terminated at block 516, the method 500 proceeds to decision block 534 where the node controller 120 determines whether mobile 2's request to resume its connection should be queued or ended. If the call request to resume is to be ended, the method 500 follows the "no" branch to block 522 where the node controller 120 ends the request of mobile 2 112 to resume its terminated call. Alternatively, the method 500 follows the "yes" branch from block 534 to block 536 where the node controller 120 puts mobile 2's request to resume its terminated call into the ordered queue and notifies mobile 2 112 that its request to resume has been queued.

At decision block 526, a determination is made whether the call is to be terminated. Typically, a notification sent to mobile 2 112 queries a remote user whether the call should be terminated. The notification can be a message to the remote user including a query prompting the remote user to accept or decline termination of the call. In any event, a response from the remote user and/or mobile 2 112 is sent back to the packet switch. If the remote user accepts call termination, then the "yes" branch is followed to block 528 where the method 400 terminates the call.

If the user does not accept call termination at decision block 526, then the "no" branch is followed to block 530 where the queue is ordered. The call requests in the queue wait for the next available channel in node 104 for the call request at the head of the ordered queue as indicated by the return path to block 508. The method 500 then returns to block 508 to seek the next available channel in node 104 for the call request for the remote user at the head of the queue.

While the above description contains many specifics, the specifics should not be construed as limitations on the scope of the invention, but merely as exemplifications of the disclosed embodiments. Those skilled in the art will envision many other possible variations that are within the scope of the invention.

The invention I claim is:

1. A method for managing network resources in a communications system having a packet switch and a network access node with a limited number of channels for communicating with remote user devices, the method comprising:
   assigning a priority to a first remote user device;
   receiving a request for service for the first remote user device;
   retrieving the priority for the first remote user device;
   ascertaining if any channel of the network access node for the first remote user device is idle;
   if a channel is idle,
      allocating the channel for the first remote user device; and
   if all channels are busy,
      placing the request for service for the first remote user device in a queue;
      ordering the queue based on priorities of the remote user devices in the queue; and
      when one of the channels becomes idle, allocating the idle channel to the remote user device at the head of the queue.

2. The method of claim 1, further comprising:
   prior to placing the request for service for the first remote user device in the queue, determining whether a second remote user device using one of the network access node has a priority lower than the first remote user device;
   if the second remote user device has a lower priority than the first remote user device, then terminating the call of the second remote user device; and
   allocating the channel of the second remote user device to the first remote user device.

3. The method of claim 1, further comprising:
   if priority of another remote user device is higher than the first remote user device, storing data associated with the request for service for the first remote user device until a channel is available for the first remote user device.

4. The method of claim 3, further comprising:
   when one of the channels is available for the first remote user device, forwarding the stored data to the first remote user device.

5. The method of claim 1, wherein placing the request for service for the first remote user device in a queue, further comprises:
   notifying a caller from a remote user device associated with the request for service that the request for service has been queued.

6. The method of claim 2, wherein prior to terminating the call of the second remote user device, further comprises:
   notifying the second remote user device that the call of the second remote user device is being terminated.

7. The method of claim 2, wherein determining whether a second remote user device using a channel of the network access node has a priority lower than the first remote user device, further comprises:
   determining a priority based on a duration of the second remote user device's call.

8. The method of claim 2, wherein upon terminating the call of the second remote user device, a request for service for the second remote user device is placed in the queue for connection when an idle channel becomes available.

9. The method of claim 1, wherein receiving a request for service at the packet-based switch for a first remote user device, comprises:
   determining whether the request for service is a voice call or a data call; and
   assigning a higher priority to the first remote user device when the request for service is a voice call.

10. A method for managing network resources in a communications system having a packet switch and a network access node with a limited number of channels for communicating with remote user devices, the method comprising:
    receiving a request for service for a broadcast call;
    assigning a higher priority to the request for service for a broadcast call;
    ascertaining if any channel at the network access node of a first remote user device is idle;
    if all channels are in use:
       queuing a call of another remote user device with a lower priority than a first remote user device; and
       allocating the channel of the other remote user device to the first remote user device.

11. The method of claim 10, further comprising:
    if another remote user with a priority lower than the first remote user device is not found, placing the request for service for the first remote user device in a queue;
    ordering the queue; and
    when a channel becomes idle, allocating that idle channel to a remote user device at the head of the queue.

12. The method of claim 10, wherein the request for service for a broadcast call is selected from a group consisting of: an emergency call, and an emergency services call.

13. A method for storing and forwarding data in a communications system having a packet switch and a network access node with a limited number of channels for communicating with remote user devices, the method comprising:
    assigning a priority for each remote user device;
    receiving a request for service for a first remote user device;
    retrieving the priority for the first remote user device; and
    determining whether the request for service is for a data call;
    if the request for service is for a data call, determining whether to store incoming data associated with the data call; and
    if incoming data associated with the data call is stored, terminating the data call connection.

14. The method of claim 13, wherein determining whether to store incoming data associated with the data call, further comprises:
   estimating a length of time before one of the channels is available for the first remote user; and
   if the length of time exceeds a predetermined time, storing the incoming data associated with the data call.

15. The method of claim 13, further comprising:
   if the request for service is for a voice call, ascertaining an availability of any of the channels for the first remote user device;
   if one of the channels is idle,
      allocating the channel to the first remote user device;
   if all channels are busy,
      comparing the priority of the first remote user device with the priority of another remote user device;
      if the priority of another remote user device is lower than the first remote user device, allocating the channel of the other remote user device to the first remote user device;
      if the priority of another remote user device is higher than the first remote user device, queuing the request for service until one of the channels is idle, then allocating the channel for the first remote user device; and
   if the request for service is for a data call, forwarding the stored incoming data associated with the data call to the first remote user device.

16. A communications system having a switch operative to handle data and voice calls, a network access node with a limited number of channels for communicating with remote user devices, the switch comprising:
   storing means associated with a database in which a priority for each remote user device is stored; and
   controlling means operatively connected to the storing means for controlling the switch, the controlling means further for:
      ascertaining an availability of the limited number of channels at the network access node;
      receiving a request for service at the switch for a first remote user device;
      retrieving the priority for the first remote user device;
      if none of the channels are idle:
         placing the request for service for the first remote user device in a queue;
         ordering the queue based on the priority of the remote user devices in the queue; and
         when one of the channels becomes idle, allocating that idle channel to the remote user device at the head of the queue.

17. The communications system of claim 16, wherein the controlling means further for:
   prior to placing the request for service for the first remote user device in a queue, searching for a second remote user device with a priority lower than the first remote user device among the remote user devices that are using the channels at the access node;
   if the controlling means finds a second remote user device with a priority lower than the first remote user device, terminating the call of the second remote user device; and
   allocating the channel of the second remote user device to the first remote user device.

18. The communications system of claim 16, wherein the first remote user device is assigned multiple channels with one or more priorities.

19. The communications system of claim 16, wherein the controlling means further for searching for the second remote user device based on the duration of the second remote user device's call.

20. The communications system of claim 16, where upon termination of the call of the second remote user device, the controlling means further for placing a request for service for the second remote user device in the queue for connection when the idle channel becomes available.

21. The communications system of claim 16, wherein the switch further comprises buffering means for receiving and storing inbound data when the request for service for the first remote user device includes transmitting the data to the first remote user device, wherein the inbound data is stored in the buffering means until the first remote user device is assigned an idle channel and the inbound data is transmitted to the first remote user device from the buffering means when the first remote user device is assigned the idle channel.

22. The system of claim 16, wherein the switch is a packet-based switch.

23. In a communications system having a switch operative to handle a data or a voice call, a network access node with a limited number of channels for communicating with remote user devices, the switch comprising:
   a storing means associated with a database in which a priority for each remote user device is stored; and
   controlling means connected to the storing means for controlling the functions of the switch, wherein the controlling means further for:
      receiving a request for service at the switch for a first remote user device;
      ascertaining if any channel at the access node of the first remote user device is idle;
      if none of the channels are idle:
         searching for a second remote user device with a priority lower than the first remote user device among the remote user devices that are using the channels at the access node;
         if a second remote user device with a priority lower than the first remote user device is found, terminating the call of the second remote user device; and
         allocating the channel of the second remote user device to the first remote user device.

24. The communications system of claim 23, wherein the controlling means further for:
   if a second remote user device with a priority lower than the first remote user device is not found, establishing a queue and placing the request for service for the first remote user device in the queue;
   ordering the queue; and
   when one of the channels becomes idle, allocating that idle channel to a remote user device based on the order of the queue.

25. The communications system of claim 23, wherein the first remote user device is assigned multiple channels with one or more priorities.

26. The communications system of claim 23, wherein the controlling means further for searching for the second remote user device based on the duration of the second remote user device's call.

27. The communications system of claim 23, where upon termination of the call of the second remote user device, the controlling means further for placing a request for service for the second remote user device in the queue for connection when the idle channel becomes available.

28. The communications system of claim 25, wherein the controlling means further for ordering the queue based on the priority of the remote user devices in the queue.

29. The communications system of claim 23, wherein the controlling means further for ordering the queue based on the priority of the remote user devices in the queue.

30. The communications system of claim 23, wherein the switch further comprises buffering means for receiving and storing inbound data when the request for service for the first remote user device includes transmitting the data to the first remote user device, wherein the inbound data is stored in the buffering means until the first remote user device is assigned the idle channel and the inbound data is transmitted to the first remote user device from the buffering means when the first remote user device is assigned the idle channel.

31. The method of claim 1, wherein the network access node includes a plurality of network access nodes.

\* \* \* \* \*